No. 867,591. PATENTED OCT. 8, 1907.
R. N. OAKMAN.
PNEUMATIC VALVE CONTROLLING APPARATUS FOR GAS BURNERS.
APPLICATION FILED SEPT. 26, 1906.
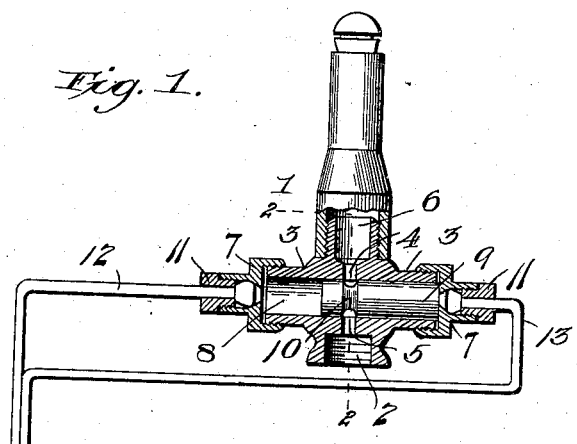
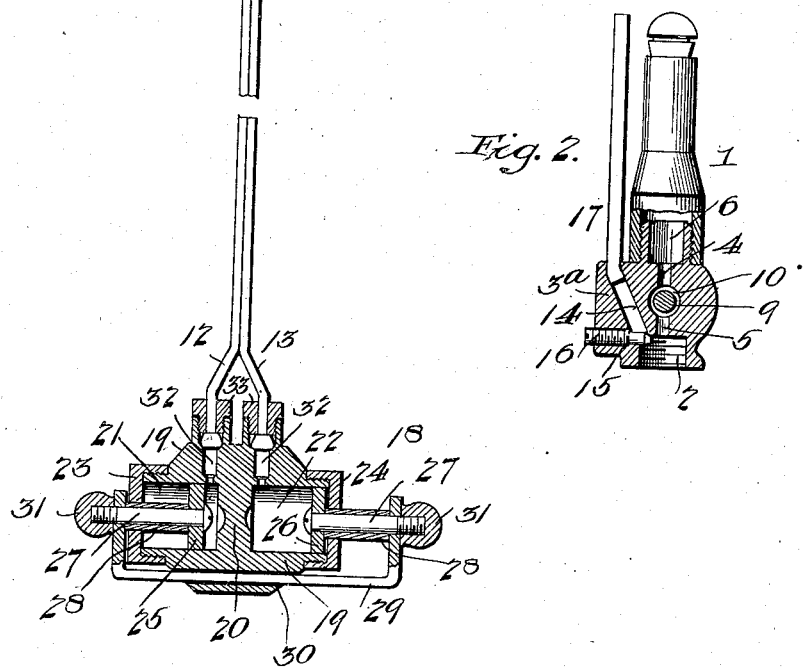
Witnesses
T. L. Mockane
James F. Crown
Inventor
R. N. Oakman
E. B. Clark
Attorney

UNITED STATES PATENT OFFICE.

RICHARD N. OAKMAN, OF BROOKLYN, NEW YORK.

PNEUMATIC VALVE-CONTROLLING APPARATUS FOR GAS-BURNERS.

No. 867,591.  Specification of Letters Patent.  Patented Oct. 8, 1907.

Application filed September 26, 1906. Serial No. 336,297.

*To all whom it may concern:*

Be it known that I, RICHARD N. OAKMAN, a citizen of the United States, residing at Brooklyn, in the county of Queens and State of New York, have invented certain new and useful Improvements in Pneumatic Valve-Controlling Apparatus for Gas-Burners, of which the following is a specification:

This invention relates to pneumatically controlled valves for gas burners used in distance lighting devices or systems.

The object of my invention is to provide for positively and forcibly reciprocating a piston valve in a chamber for opening and closing ports connecting with the gas passage of a burner, by utilizing both positive pressure and exhaust, or suction, simultaneously at opposite ends of the valve chamber, through the action of a double acting pump and double pipe connection.

Another object is to provide for reciprocating a piston valve, to open and close gas ports, at a greater distance from the valve chamber than was heretofore practicable, and to prevent the danger of leakage of gas from said chamber.

The matter constituting my invention will be defined in the claims.

The details of construction of my improved apparatus are illustrated in the accompanying drawings, in which,—

Figure 1 represents a sectional elevation of a gas burner, a double acting pump and pipe connections to the burner embodying my invention. Fig. 2 represents a vertical section of the burner taken on line 2—2, Fig. 1.

The pillar 1 is made with the usual base or screw-threaded socket 2 and is preferably cast with two bosses or extensions 3 at opposite sides and has the usual longitudinal passage-way 6 leading to the burner tip. The burner tip may be of the type shown, or an incandescent burner of a well known construction. A transverse cylindrical chamber 8 is made in the pillar and its extensions 3 and is provided centrally with the ports 4 and 5 connecting with passage-way 6. The outer ends of the extensions 3 are externally screw-threaded and provided with screw-threaded caps 7, through which the pipe connections are made. In the chamber 8 is placed a close fitting piston valve 9 which is provided near one end with an annular groove 10 which is adapted to register with the ports 4 and 5, as shown in Fig. 1, and thus provide a through-way for gas to the burner. The caps 7 are provided with central openings which are internally screw-threaded at their outer ends for receiving the hollow coupling nuts 11. The ends of pipes 12 and 13 are inserted through openings in the hollow nuts 11 and extend into the openings of the caps, where they are provided with suitable packing for making tight joints, the ends of the pipes being spread or enlarged so that they will not pass into the piston chamber 8. The pillar 1 is provided at one side with a boss 3ª for containing a by-pass leading to a pilot-burner. In this boss is bored a passage-way 14 which is inclined downward and inward, and a horizontal passage-way 15 joining the lower end of said passage-way 14. In the passage-way 15 is inserted a screw-threaded valve plug 16 having a pointed end for controlling the amount of gas admitted to the pilot burner. In the upper end of passage-way 14 is inserted the pilot-tube 17 which opens at its upper end adjacent to the burner tip, as shown in Fig. 2.

The pipes 12 and 13 each serve alternately as a pressure and an exhaust pipe for an aeriform fluid to positively reciprocate the piston valve 9 in its chamber. Any suitable means may be used for positively forcing the aeriform fluid through one pipe while at the same time fluid is exhausted through the other pipe, and for the purpose of illustration, I have shown a double acting pump 18 which will be described below. The pump is constructed with a hollow body portion 19 having a central transverse partition 20 and, on each side thereof, the piston chambers 21 and 22, extending through the ends of the body. The outer ends of the body are externally screw-threaded and closed by tight fitting caps or heads 23 and 24. In the piston chambers are fitted two pistons 25 and 26, secured to the inner ends of rods 27, and upon said rods are placed the sleeves abutting at their inner ends against the pistons and at their outer ends against the inwardly turned ends of the yoke 29. The outer screw-threaded ends of the rods 27 pass through the ends of the yoke and have applied to them the clamping nuts 31. The under side of the body 19 is provided with a longitudinal guideway 30, through which is passed the yoke 29. Adjacent to the partition 20, at the top, are provided the two outwardly extending ports 32, to which are connected by means of nuts 33, the pipes 12 and 13 leading to the burner device. The coupling joints are provided with packing and the inner ends of the pipes are spread so that they will not pass into the piston chambers. This double acting pump is made small and is intended to hold in one hand of an operator for forcing either piston inward while at the same time the other piston is forced outward, through the connection of the yoke 29. The construction is very simple and compact and gives satisfactory results in practice.

In practice, the pilot burner is usually kept lighted, the flow of gas being controlled by valve 16 in the pillar. When it is desired to light the gas at the main burner tip, the piston 25 is pushed inward and the piston 26 simultaneously pushed outward as shown in the drawing, thereby forcing air positively through pipe 12 and against the end of the piston valve 9 and exhausting air from the opposite end of the piston chamber through pipe 13 and into the piston chamber 22 of the pump. When it is desired to extinguish the flame at the main burner, the pump pistons are pushed in the reverse direction, thereby throwing the piston valve 9 to the opposite end of the chamber and closing the ports 4 and 5. Since there are no vents in the piston chamber 8, and the pipes 12 and 13 make close connections between the chamber and the pump cylinder, gas which escapes from the passage-way of the pillar into the chamber will be conducted by the exhaust pipe into the pump cylinder, thus avoiding the objectionable leakage into the external air, which is so liable to occur with burners having a vent in the piston-chamber. I do not wish to be confined to a piston valve 9 having an annular groove 10, as other forms of valves may be used for opening and closing the ports 4 and 5; nor do I wish to be confined to the particular construction of double acting pump shown, as it may be modified in construction and the same results secured.

Having described my invention, what I claim, and desire to secure by Letters Patent, is,—

1. The combination with a burner pillar having a gas passage and a transverse piston chamber provided with ports opening into said passage, of pressure and exhaust pipes connecting at opposite ends of the piston chamber, said chamber being otherwise closed at its ends, a reciprocating valve in the chamber, means for positively forcing a fluid into one end of the chamber and simultaneously exhausting it from the opposite end, for positively reciprocating the valve and preventing leakage of gas, substantially as described.

2. The combination with a burner pillar and a transverse valve chamber opening by ports into the passage-way of the pillar, of a pressure and exhaust pipe connecting with each end of the chamber and with the cylinder of a pump, a reciprocating valve in said chamber and a double acting pump for positively reciprocating the valve and preventing leakage of gas, substantially as described.

3. In apparatus for pneumatically controlling valves for distance lighting burners, a pressure and exhaust device, consisting of two adjacent pump cylinders, each having a port and a piston, means connecting the pistons and a pipe connection from each cylinder to the opposite ends of the valve chamber in the burner, substantially as described.

In testimony whereof I affix my signature in presence of two witnesses.

RICHARD N. OAKMAN.

Witnesses:
M. TURNER,
E. B. CLARK.